(12) United States Patent
Bala

(10) Patent No.: US 9,056,249 B2
(45) Date of Patent: Jun. 16, 2015

(54) DEVICE AND METHOD FOR A STREAMING VIDEO GAME

(75) Inventor: Karthik Bala, Menands, NY (US)

(73) Assignee: Activision Publishing, Inc., Santa Monica, CA (US)

(*) Notice: Subject to any disclaimer, the term of this patent is extended or adjusted under 35 U.S.C. 154(b) by 671 days.

(21) Appl. No.: 12/416,863

(22) Filed: Apr. 1, 2009

(65) Prior Publication Data

US 2010/0255903 A1 Oct. 7, 2010

(51) Int. Cl.

| A63F 9/24 | (2006.01) |
| A63F 13/00 | (2014.01) |
| G06F 17/00 | (2006.01) |
| G06F 19/00 | (2011.01) |
| A63F 13/30 | (2014.01) |
| H04N 21/478 | (2011.01) |
| H04N 21/81 | (2011.01) |
| H04N 21/84 | (2011.01) |

(52) U.S. Cl.
CPC ........... *A63F 13/12* (2013.01); *A63F 2300/409* (2013.01); *A63F 2300/6009* (2013.01); *A63F 2300/8047* (2013.01); *H04N 21/4781* (2013.01); *H04N 21/8113* (2013.01); *H04N 21/84* (2013.01)

(58) Field of Classification Search
CPC .............. A63F 13/12; A63F 2300/409; A63F 2300/6009; A63F 2300/8047; H04N 21/4781; H04N 21/8113; H04N 21/84
USPC .......................... 463/7, 23, 30, 36, 40, 42, 43
See application file for complete search history.

(56) References Cited

U.S. PATENT DOCUMENTS

| 5,537,409 A * | 7/1996 | Moriyama et al. ............. 370/471 |
| 6,022,223 A * | 2/2000 | Taniguchi et al. ......... 434/307 A |
| 6,077,084 A * | 6/2000 | Mino et al. ................ 434/307 A |
| 6,227,974 B1 * | 5/2001 | Eilat et al. ....................... 463/40 |
| 6,496,896 B1 * | 12/2002 | Inoue ............................. 710/306 |
| 2003/0027639 A1 * | 2/2003 | Peterson et al. ................. 463/42 |
| 2003/0050058 A1 * | 3/2003 | Walsh et al. .................. 455/426 |
| 2005/0123886 A1 * | 6/2005 | Hua et al. ................... 434/307 A |
| 2005/0255914 A1 | 11/2005 | McHale et al. |
| 2006/0013563 A1 * | 1/2006 | Adolph et al. .................. 386/95 |

(Continued)

FOREIGN PATENT DOCUMENTS

| KR | 10-2000-0053730 | 9/2000 |
| KR | 10-2010-0028858 | 3/2010 |

OTHER PUBLICATIONS

International Search Report on corresponding PCT application (PCT/US2010/029697) from International Searching Authority (KR) dated Nov. 19, 2010.

Written Opinion on corresponding PCT application (PCT/US2010/029697) from International Searching Authority (KR) dated Nov. 19, 2010.

*Primary Examiner* — Victor A Mandala
*Assistant Examiner* — Quovaunda V Jefferson
(74) *Attorney, Agent, or Firm* — Klein, O'Neill & Singh, LLP

(57) ABSTRACT

A streaming music based video game and device for the generation of the same. The device receives a transmission stream through a cable, satellite, wireless, or other communications system with audiovisual information and game data. The device generates a music based video game from the audiovisual information and game data and provides the audiovisual information and video game information to a display.

10 Claims, 10 Drawing Sheets

(56) References Cited

U.S. PATENT DOCUMENTS

| | | | |
|---|---|---|---|
| 2007/0059670 A1* | 3/2007 | Yates | 434/107 |
| 2007/0243915 A1 | 10/2007 | Egozy et al. | |
| 2008/0200224 A1 | 8/2008 | Parks | |

* cited by examiner

DEVICE AND METHOD FOR A STREAMING VIDEO GAME

BACKGROUND OF THE INVENTION

The present invention relates generally to video games, and more particularly to video game streaming content provision and play.

Video games provide a source of entertainment for many. Video games often provide an interactive activity that can be interesting and challenging, and video games may allow game players to take on simulated roles and engage in simulated activities that may for reasons of skill, equipment or availability otherwise be unavailable.

Music-based video games often provide an interactive experience allowing a game player to simulate play of a musical instrument, generally in accompaniment or interaction with prerecorded music, and such video games often include game controllers generally in the shape of a musical instrument, providing heightened realism for music-based game play. Different game players may prefer, however, to play different varieties of music or, even within particular varieties, music of different artists. Considering the large number of different types or varieties of music, and the very large number of artists who record or have recorded music, providing a sufficient amount of music desired by a multitude of different game players may be difficult.

Moreover, some game players may enjoy being presented different music at different times, for example music they had not considered with respect to game play or music with which they are unaware.

BRIEF SUMMARY OF THE INVENTION

In one aspect of the invention, the invention provides a device for use in a video game capable system, comprising: an input for receiving input data, the input data including audiovisual information and instructive cue information for a music-based game; communication reception circuitry configured to receive game controller signals; and at least one processor configured a) to process the note chart data to generate instructive cue display information, the instructive cue display information including instructive cues, b) cause provision of the instructive cue display information to a display system, c) cause provision of at least the audiovisual information to the display system, and d) determine extent of game player compliance with the instructive cues of the note chart display information based on the game controller signals.

In another aspect of the invention, the invention provides a method of providing music-based game play, comprising: receiving from a communications network a data stream including audiovisual information and instructive cue information; generating instructive cue display information using the instructive cue information; providing the instructive cue display information to a display system; and providing the audiovisual information to the display system.

These and other aspects of the invention are more fully comprehended upon review of this disclosure.

DETAILED DESCRIPTION

Figure 1:
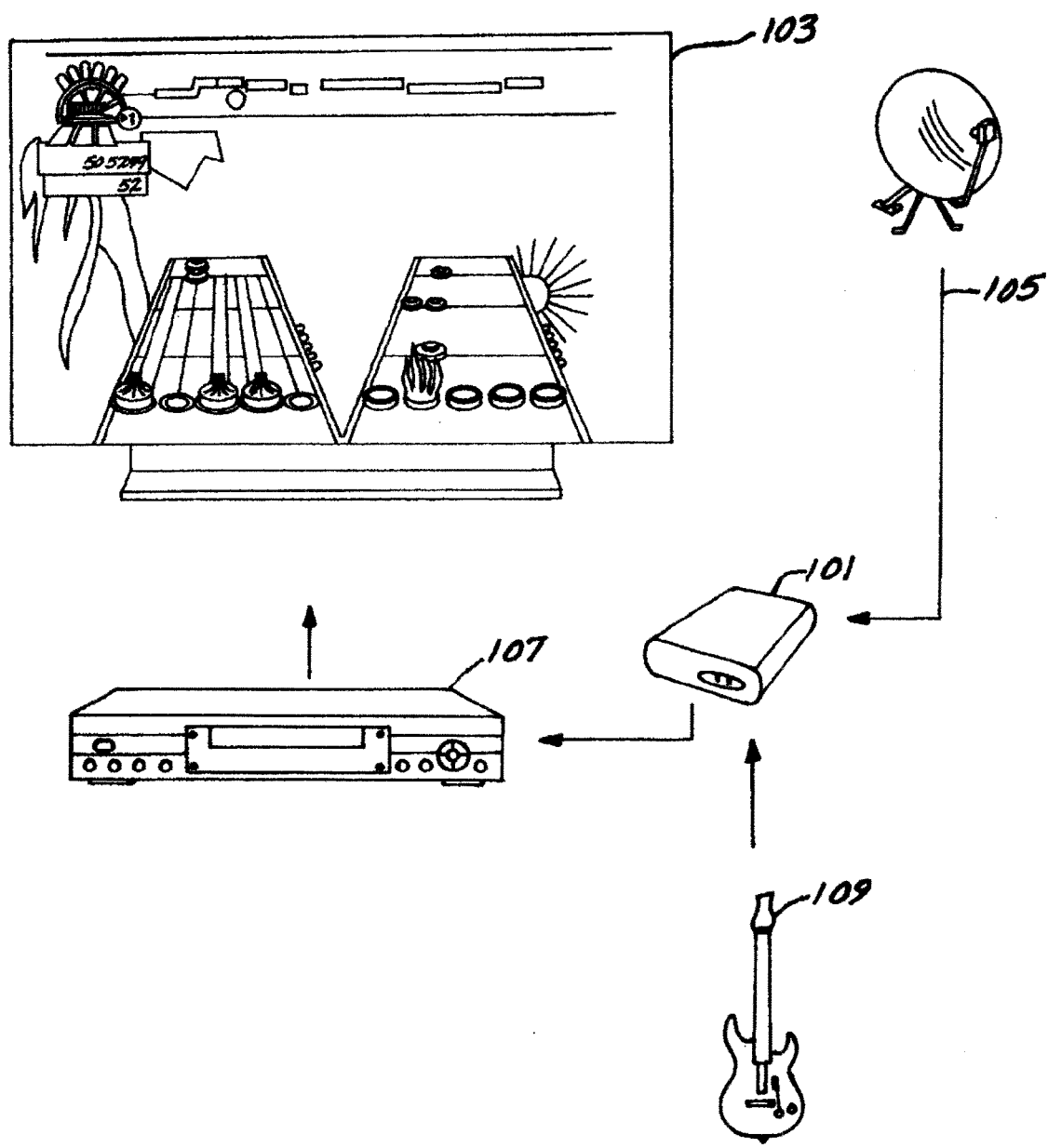
FIG. 1 illustrates an example of a wireless transmission system in accordance aspects of the invention.

FIG. 1 is an example of a video game related system in accordance with aspects of the invention. The video game related system includes a first component 101, which for convenience may be termed a PnP device, a display unit 103, a digital video recorder or tuner box 107, and controller 109. In some embodiments, the PnP device or functions of the PnP device may be integrated with the digital video recorder or tuner box. The PnP device receives a satellite broadcast signal by way of a satellite communications antenna. The PnP device includes circuitry for processing the satellite broadcast signal and for providing video game functions, for example by executing program instructions related to execution of a video game. The PnP device typically includes one or more processors, memory, and various interface circuitry. The satellite broadcast signal includes audiovisual information and game data for the video game. In some embodiments, the audiovisual information and game data of the broadcast signal is in accordance with an ATSC data broadcast standard, but in many cases includes audiovisual information in an MPEG or MPEG-like format. However, in some embodiments, the audiovisual information may be in other common audio/video formats, for example, a Windows Media format, a RealMedia format, or an Adobe Flash format. In some embodiments the audiovisual information is received in a compressed format. Video of the audiovisual information may have been compressed using a discrete cosine transform, or some other transform, and motion compensation, for example as generally performed for MPEG or MPEG-like encoding. The PnP device renders instructive cue information, score, and, in some embodiments, other game related graphics. In many embodiments, the PnP device acts as a pass through device for audiovisual information of the broadcast signal, with the PnP device providing an overlay of rendered instructive cue information and possibly audio and/or messages over audio and video generated from the audiovisual information. The instructive cue information, for example, may be provided in the form of gems which scroll through part of a display, with possibly associated portions of the display rendered by the PnP device.

The PnP device is coupled to the controller by a wireless connection, although it should be recognized that in many embodiments the controller and PnP device may be coupled by a wired connection. In addition, the controller illustrated in FIG. 1 is in the shape of a guitar, in various embodiments other controllers may instead or additionally be used, for example generic controllers, microphones, drums, drumsticks, DJ turntables, keyboards, other shaped guitars, motion sensing controllers, step sensing controllers, dance pads, balance based controllers, or controllers in the general form of other musical instruments.

In some embodiments, and as illustrated in FIG. 1, the PnP device is also in communication with the digital video recorder or tuner box, generally through a HDMI, component, composite, or similar wired audio-video connection, although a wireless connection may be used in some embodiments. The PO device provides the audiovisual information of the satellite broadcast signal to the digital video recorder or tuner box. The digital video recorder or tuner box generates audio and video information and provides the information to the display unit. The display unit is typically a television, although in some embodiments a monitor may be used, with a display screen and at least one audio output device, such as a speaker.

In the embodiment of FIG. 1, the display screen shows a screen shot of video game play in a music-based video game. In some embodiments, no separate digital video recorder or tuner box is used and the PnP device is in direct communication with the display, generally through a HDMI, component, composite, or similar wired audio-video connection, although a wireless connection may be used in some embodiments. Additionally, in other embodiments, the PnP device receives audio/video from the digital video recorder or tuner box, or in parallel with the digital video recorder or tuner box, and is in communication directly with the display.

In some embodiments, the PnP device may be addressable by the service provider through a telephone line connection. For example, the PnP device may include an internal modem or modem-like device which allows it to connect to a remote server of a service provider for subscription or pay-per-view service provision. For example in some embodiments, availability of instructive cues associated with audiovisual information may only be available as part of a subscription or pay-per-view service, or both audiovisual information and instructive cues may only be available as part of a subscription or pay-per-view service. For further example, the PnP device may transmit or customer information to the service provider or billing agency upon access or request to access audiovisual information and/or instructive cues. In some embodiments, a key or code may also be provided to an addressable PnP device. The PnP device may use the key or code to decrypt encrypted audiovisual information, for example, audiovisual information associated with subscription or pay-per-view services.

Figure 2:
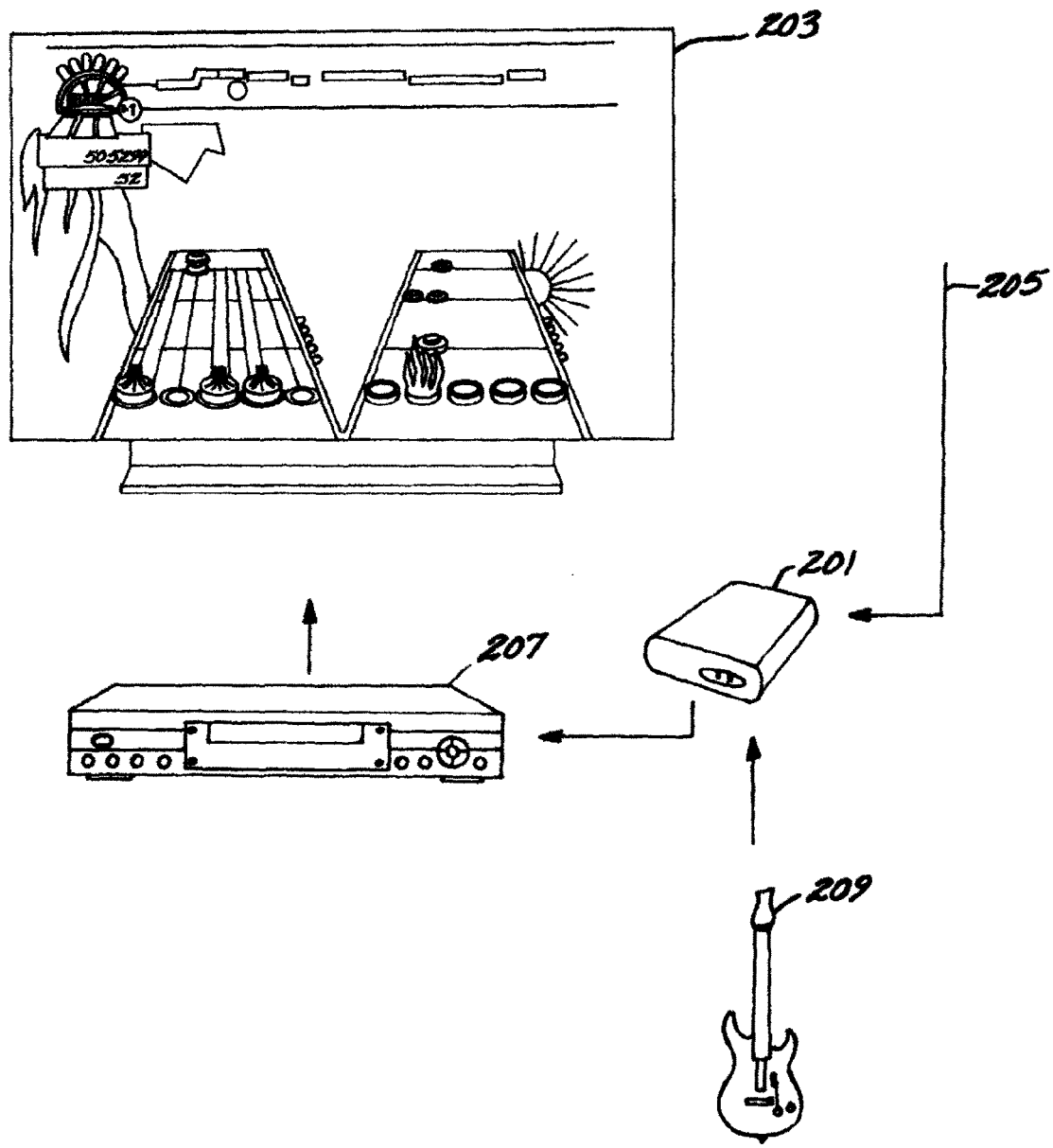
FIG. 2 illustrates a further example of a wired transmission system in accordance with aspects of the invention.

FIG. 2 is an example of a video game related system in accordance with aspects of the invention. The video game related system includes a first component 201, which for convenience may be termed a PnP device, a display unit 203, a digital video recorder or tuner box 207, and controller 209. In some embodiments, the PnP device or functions of the PnP device may be integrated with the digital video recorder or tuner box. In many embodiments, the PnP device receives a cable broadcast signal by way of a coaxial communications cable. In some embodiments the PnP device receives a cable broadcast signal by way an optical fiber communications cable. In some embodiments, the PnP device receives a TCP/IP signal, and the digital video recorder or tuner box may be replaced with a set top box suitable for use with such applications. The PnP device includes circuitry for processing the cable broadcast signal, or other signal, and for providing video game functions, for example by executing program instructions related to execution of a video game. The PnP device typically includes one or more processors, memory, and various interface circuitry. The cable broadcast signal includes audiovisual information and game data for the video game. In some embodiments, the audiovisual information and game data of the broadcast signal is in accordance with an ATSC data broadcast standard, but in many cases includes audiovisual information in an MPEG or MPEG-like format. However, in some embodiments, the audiovisual information may be in other common audio/video formats, for example, Windows Media, RealMedia, or Adobe Flash. In some embodiments the audiovisual information is received in a compressed format. Video of the audiovisual information may have been compressed using a discrete cosine transform, or some other transform, and motion compensation, for example as done with MPEG or MPEG-like encoding. The PnP device renders instructive cue information, score, and in some embodiments, other game related graphics. In many embodiments, the PnP device acts as a pass through device for audiovisual information of the broadcast signal, with the PnP device providing an overlay of rendered instructive cue information and possibly audio and/or messages over audio and video generated from the audiovisual information. The instructive cue information, for example, may be provided in the form of input timing indicators, which scroll through part of a display, with possibly associated portions of the display rendered by the PnP device. In some embodiments the input timing indicators may be displayed as gems or other as other markers.

The PnP device is coupled to the controller by a wireless connection, although it should be recognized that in many embodiments the controller and PnP device may be coupled by a wired connection. In addition, the controller illustrated in FIG. 2 is in the shape of a guitar, in various embodiments other controllers may instead or additionally be used, for example generic controllers, microphones, drums, drumsticks, DJ turntables, keyboards, other shaped guitars, motion sensing controllers, step sensing controllers, dance pads, balance based controllers, or controllers in the general form of other musical instruments.

In some embodiments, and as illustrated in FIG. 2, the PnP device is also in communication with the digital video recorder or tuner box, generally through a HDMI, component, composite, or similar wired audio-video connection, although a wireless connection may be used in some embodiments. The PnP device provides the audiovisual information of the cable broadcast signal to the digital video recorder or tuner box. The digital video recorder or tuner box generates audio and video information and provides the information to the display unit. The display unit is typically a television, although in some embodiments a monitor may be used, with a display screen and at least one audio output device, such as a speaker.

In the embodiment of FIG. 2, the display screen shows a screen shot of video game play in a music-based video game. In some embodiments, no separate digital video recorder or tuner box is used and the PnP device is in direct communication with the display, generally through a HDMI, component, composite, or similar wired audio-video connection, although a wireless connection may be used in some embodiments. Additionally, in other embodiments, the PnP device receives audio/video from the digital video recorder or tuner box, or in parallel with the digital video recorder or tuner box, and is in communication directly with the display.

In some embodiments, the PnP device may be addressable, for example by being provided with a network unique identifier. The use of a network unique identifier may be useful, for example, in allowing for subscription or pay-per-view service provision. For example in some embodiments, availability of instructive cues associated with audiovisual information may only be available as part of a subscription or pay-per-view service, or both audiovisual information and instructive cues may only be available as part of a subscription or pay-per-view service. For further example, the PnP device address or other network unique identifier may be provided to a service provider or billing agency upon access or request to access audiovisual information and/or instructive cues. In some embodiments, a key or code may also be provided to an addressable PnP device. The PnP device may use the key or code to decrypt encrypted audiovisual information, for example, audiovisual information associated with subscription or pay-per-view services.

Figure 3:
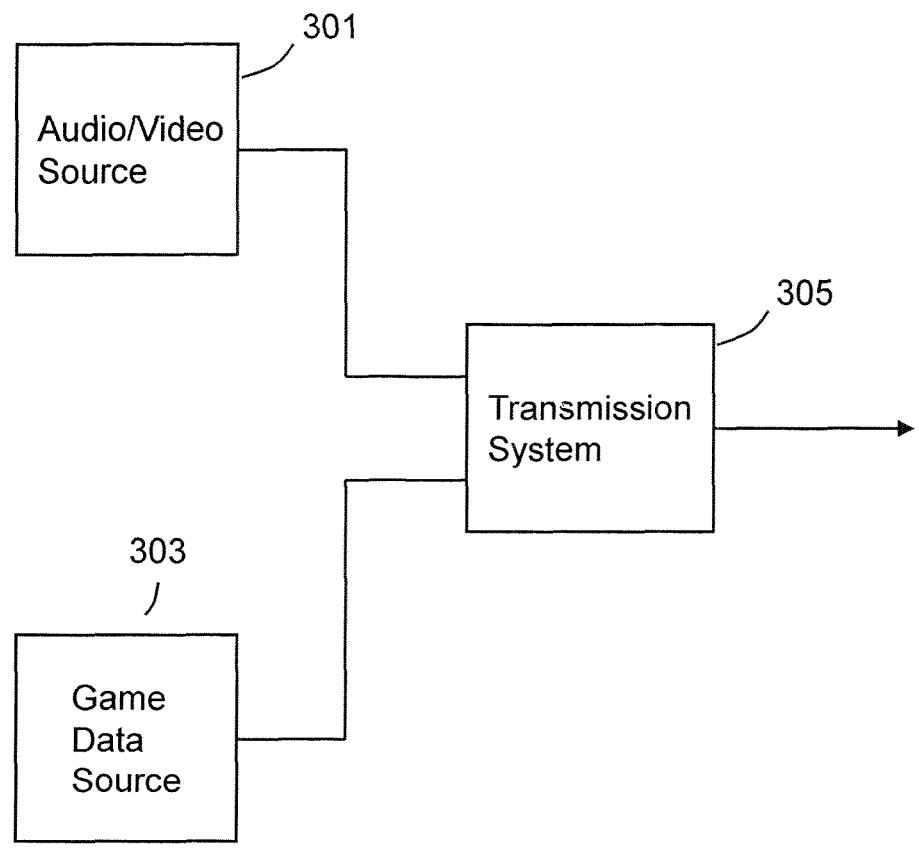
FIG. 3 illustrates a transmission side system in accordance with aspects of the invention.

FIG. 3 is a block diagram of a transmission side system in accordance with aspects of the invention. The transmission side system transmits audiovisual information and instructive cue information, with the instructive cue information being for a music-based video game. The transmission side system may, for example, be located at a broadcast station, a cable distribution center or a cable head-end, a satellite distribution station, a content provider center (which may for example distribute content to a satellite distribution station or a cable distribution center or cable head-end), or Internet web server. In addition, in some embodiments, different sets of instructive cues may be provided for the same controller, with for example, different sets of instructive cues providing for varying levels of difficulty.

The transmission side system includes an audio/video source 311. The audio/video source provides audiovisual information. In many embodiments the audiovisual information is in an MPEG or MPEG-like format. However, in some embodiments, the audiovisual information may be in other common audio/video formats, for example, a Windows Media format, a RealMedia format, or an Adobe Flash format. For example, the audiovisual information may include compressed audio information and compressed video information, and the compressed video information may have been compressed using a discrete cosine transform and motion compensation, for example as done with MPEG or MPEG-like encoding.

The transmission side system also includes a game data source 313. The game data source provides game data. In most embodiments the game data is information for instructive cues to be provided to a game player. The instructive cues may be instructive cues for operation of a single controller, or may be sets of instructive cues for a plurality of controllers. In many embodiments the instructive cues are associated with audio of the audiovisual information. For example, in some embodiments the instructive cues are timed to beats of the audio, or notes of the audio, or sounds of the audio. In many embodiments eventual presentation of the instructive cues, generally by display, are also meant to be synchronized with presentation of audio of the audiovisual information. The game data may therefore be provided in timed relation to provision of the audiovisual information. For example, in some embodiments the game data may have been generated so as to be relative in time to the audio, with provision of the audiovisual information and the game data occurring in synchronized manner, for example under the direction of control circuitry (not shown). In some embodiments the game data may include timing information, for example relative to a starting point in time or other defined point in time relative to the audiovisual information.

The transmission side system also includes a transmission system 315, although it should be recognized that in some embodiments the audio/video source and the game data source, and other components, may be considered to be included in the transmission system. The transmission system transmits the audiovisual information and game data as part of a transmission stream. In some embodiments the transmission system transmits the audiovisual information and game data in a combined program stream. In some embodiments the transmission system transmits the audiovisual information and the game data as separate program streams within the transmission stream. Accordingly, in some embodiments a transmission stream may include a plurality of program elementary streams, with at least one packetized or program elementary stream including the audiovisual information and another program elementary stream including the game data. In other embodiments the game data and the audiovisual information may be combined into a single program elementary stream. In many embodiments, however, the audiovisual information may be transmitted as at least one program elementary stream with the game data carried as synchronous and/or synchronized streaming data. Alternatively, the game data may be encapsulated as a datagram in the payload of a transport stream, by using a digital storage media command and control protocol as defined by the Advanced Television Systems Committee (ATSC), or by use of data piping.

Figure 4:
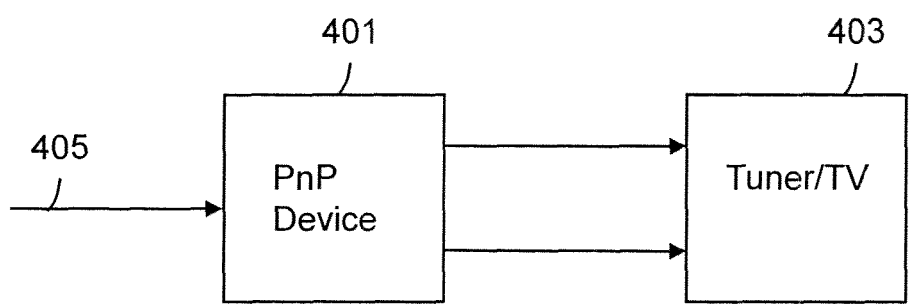
FIG. 4 illustrates the a receive side system in accordance with aspects of the invention.

FIG. 4 is a block diagram of a reception side system in accordance with aspects of the invention. The reception side system receives audiovisual information and game data. The reception side system may, for example, be located at a residence of a game player or other location utilized by a game player. The audiovisual information and game data is in some embodiments the audiovisual information and game data provided by the transmission side system of FIG. 3, in some instances directly, in some instances using intervening components, and in some instance being communicated through use of intervening systems.

The reception side system includes a first component 401, with the first component coupled to a display system 403, which in some embodiments includes a television tuner or set-top box for a cable or satellite system. The first component receives the game data and audiovisual information, for example through a port which may be coupled to a cable of a cable distribution system or an antenna of a satellite reception system. The first component processes the game data to generate game display information, which is provided to the display information. In some embodiments the first component includes graphics circuitry to generate the game display information, or a processor configured by program instructions to generate the game display information. In some embodiments the graphics circuitry may be 2-D graphics circuitry, although in other embodiments 3-D graphics circuitry may be used. In some embodiments the first component may generate for display items such as menus, for example for setting a difficulty level or other aspect of a system feature. In some embodiments, the difficulty level, for example, may be used by the first component to select a set of instructive cues of the game date for use. The first component also provides the audiovisual information to the display system.

The first component is also configured to receive and process signals from a game controller or other input device. In most embodiments the first component processes the signals from the game controller to determine extent of game player compliance with instructive cues. In most embodiments the first component also provides feedback to the game player as to the extent of game player compliance with the instructive cues. The feedback may be in the form of a score and/or audio indicating a missed note or some other feedback. Accordingly, the first component may at times be considered a plug-and-play device as the first component may include some features with similarity to features of plug-and-play devices, which may generate game related display information and process controller signals with respect to game play. In some embodiments, the PnP device may transmit or cause transmission of player scores or other information to a server. The scores and other information may be used to provide rankings, statistics and other information associated with game play.

The display system processes the audiovisual information to present audio and video of the audiovisual information. In many embodiments the display system decompresses, and possibly formats, audio information and video information of the audiovisual information for presentation by a display and associated audio speakers. In many embodiments the display system includes an overlay function, and the display system utilizes the overlay function to also display the game display information.

Figure 5:
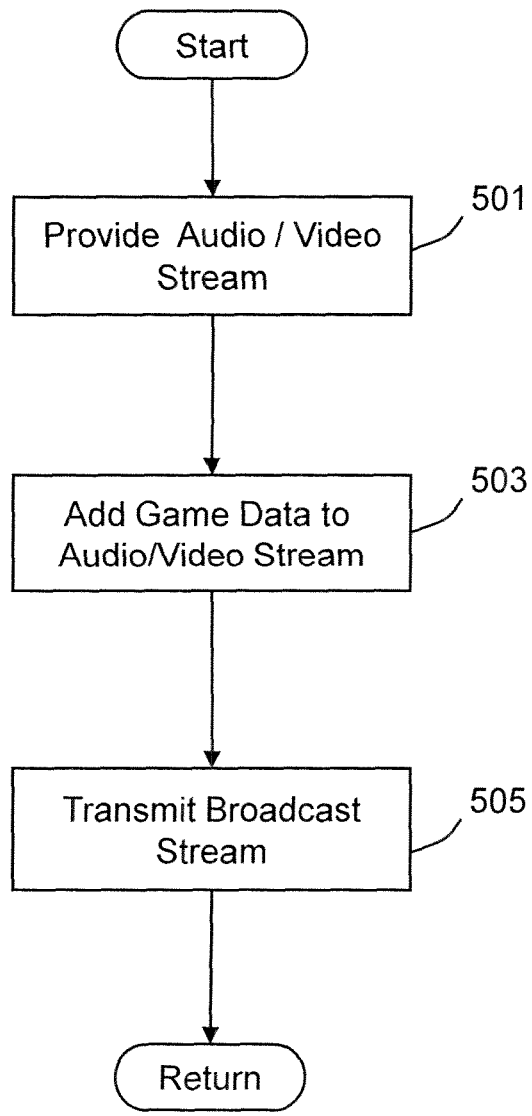
FIG. 5 is a flow diagram of audiovisual information and game data insertion into a transmission.

FIG. 5 is a flow chart of the transmit side system in accordance with aspects of the invention. In block 501, a content provider provides audiovisual information for transmission. In some embodiments, the audiovisual information may be comprised of computer generated graphics and video and a musical piece. For example, the audiovisual information may be a computer generated rock concert comprising a computer generated band and audience. In some embodiments, the audiovisual information may be an actual music video associated with a musical piece. In other embodiments, the audiovisual information may be a movie or television program with background music. In many embodiments, the audiovisual information is in an MPEG or an MPEG-like format. In some embodiments, the audiovisual information may be in, for example, a Windows Media format, a RealMedia format, or an Adobe Flash format. In some embodiments the audiovisual information is received in a compressed format. Video of the audiovisual information may have been compressed using a discrete cosine transform, or some other transform, and motion compensation, for example as done with MPEG or MPEG-like encoding. In some embodiments, the PnP device may overlay games independent of and not associated with a particular media source or television station, allowing a player to play a game while others watch a television program. For example, a player may choose to simultaneously play a simple tic-tac-toe or trivia game and watch a news program and the PnP device may overlay the game in a non-obtrusive manner over a news program.

In block 503, the content provider adds game data such as instructive cue information for a music-based video game to the transmission. The game data may include instructive cue information for a plurality of game controllers, and for a plurality of difficulty levels for each game controller. In many embodiments the instructive cues are associated with audio of the audiovisual information. For example, in some embodiments the instructive cues are timed to beats of the audio, or notes of the audio, or sounds of the audio. In many embodiments eventual presentation of the instructive cues, generally by display, are also meant to be synchronized with presentation of audio of the audiovisual information. The game data may therefore be provided in timed relation to provision of the audiovisual information.

In block 505, the combined audiovisual information and game data are transmitted as part of a transmission stream. In some embodiments, the audiovisual information and game data are transmitted in a combined program stream, for example, in a single packetized elementary stream (PES). In some embodiments the audiovisual information and the game data are transmitted as separate program streams within the transmission stream. For example, audiovisual information may be transmitted in one PES and the game data in another PES. In many embodiments, the transmission is in accordance with an ATSC data broadcast standard.

In some embodiments, the audiovisual information and game data are transmitted through a wired connection, such as coaxial cable. In some embodiments, the audiovisual information and game data are transmitted as a television broadcast, although in other embodiments, the audiovisual information and game data are transmitted as streaming media through an Internet connection. In some embodiments, the transmission is transmitted through a wireless connection, for example by means of communications satellite to a satellite dish and set-top box.

Figure 6:
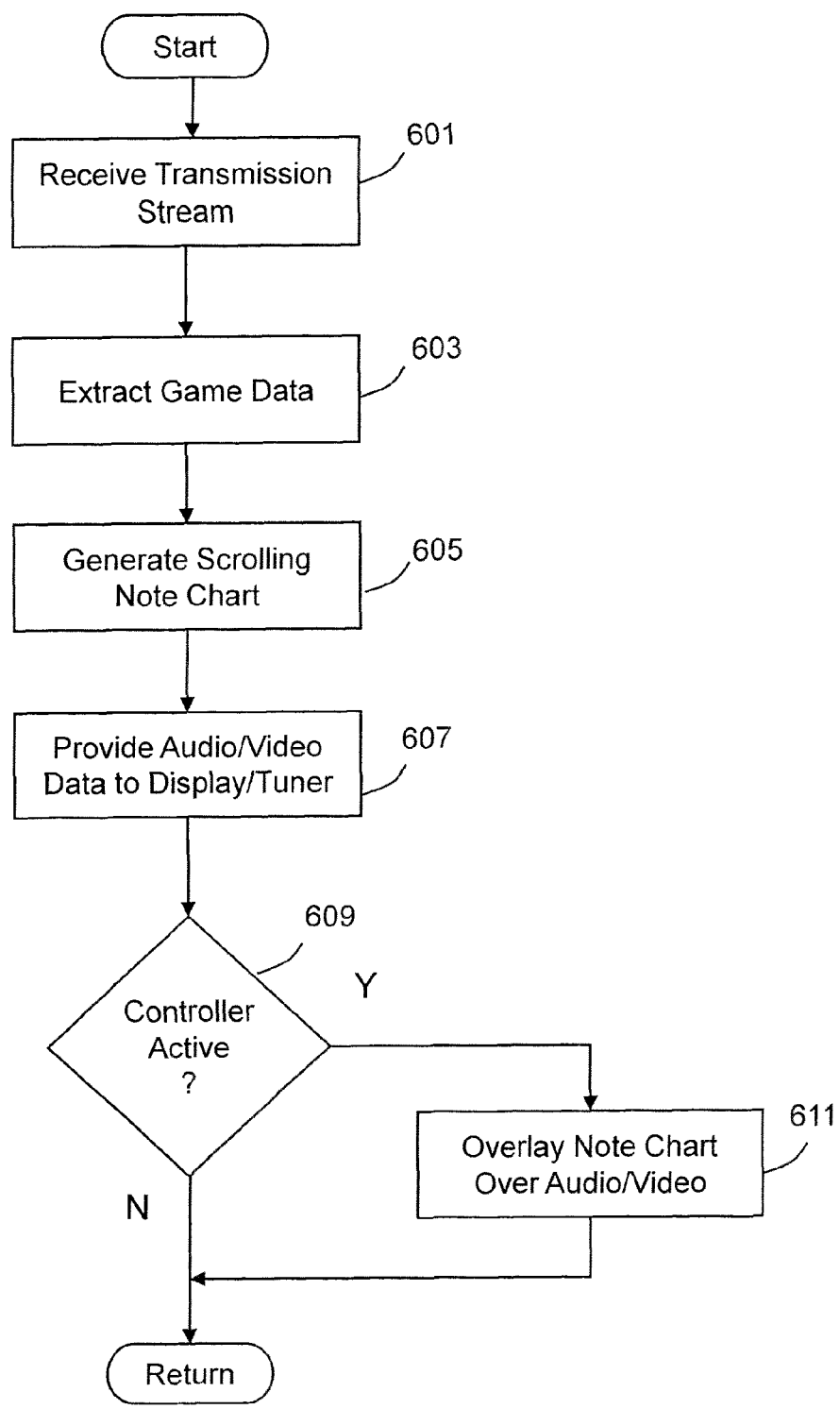
FIG. 6 is a flow diagram of PnP device operation.

FIG. 6 is a flow chart of PnP device operations in accordance with aspects of the invention. In block 601, the PnP device receives a transmission. In many embodiments, the transmission is a television broadcast signal. For example, in some embodiments, cable content providers may transmit a television broadcast signal through a coaxial cable connection. In other embodiments, the television broadcast signal may be transmitted through fiber optic connections. In some embodiments, satellite content providers may transmit the television broadcast signal by means of communications satellite to a satellite dish and set-top box. In some embodiments, the television broadcast signal is transmitted in accordance with the ATSC data broadcast standard. In other embodiments, a streaming media format is transmitted by server to the PnP device through an Internet connection. For example, in some embodiments, the PnP device is connected to the Internet wirelessly through 802.11b/g Wi-Fi or other wireless connections. In other embodiments, the PnP device may be connected to the Internet through a wired Ethernet connection.

Figure 9:
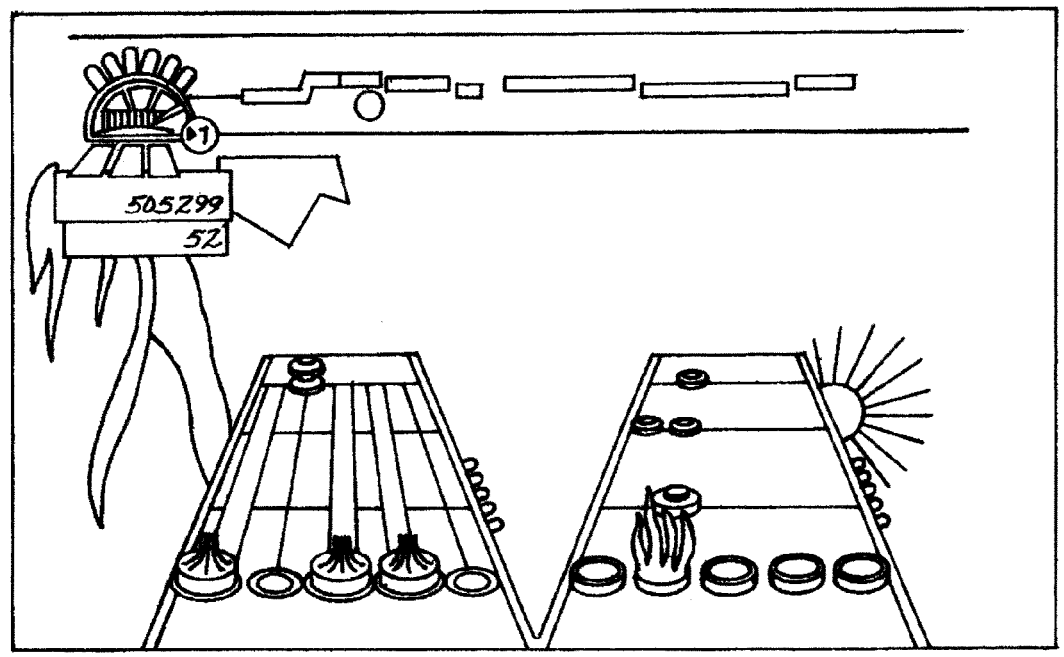
FIG. 9 illustrates a screenshot of video game play in accordance with aspects of the invention.

In block 603, the PnP device extracts game data such as instructive cue information for a music-based video game from the transmission. In some embodiments, and as discussed in block 601, the transmission may be a television broadcast signal. In many embodiments, the television broadcast stream comprises standard audiovisual information and additional game data. The PnP device extracts the game data from the television broadcast signal. In some embodiments, and as discussed in block 601, the transmission may be a streaming media format received through an Internet connection. In many embodiments, the transmission will be in an MPEG or MPEG-like format, although in other embodiments, the transmission may be in other media formats In block 605, the PnP device generates display information for instructive cues. As discussed in block 603, game data is extracted from the transmission and the extracted data is utilized by the PnP device in generating display information for instructive cues. In many embodiments, score and messaging components are also generated. In some embodiments, and as illustrated in FIG. 9, the instructive cues may be displayed with gems or the like scrolling vertically towards the bottom of a display, a score component towards the upper left of the display and a messaging component scrolling horizontally across the top of the display.

In block 607, the PnP device provides audiovisual information to a display unit. In some embodiments, the PnP device may provide the audiovisual information to the display unit through a HDMI connection. In some embodiments, the PnP device may provide the audiovisual information to the display unit through component or composite connection. In other embodiments, the PnP device may provide video data to the display unit through a HDMI, component, or composite connection while providing audio data through an optical audio connection. In some embodiments, for example where the PnP device receives a streaming media format transmission, the PnP device may provide audiovisual information to a PC, which provides the audiovisual information to the display. However, in some embodiments, for example embodiments where the PnP device receives a television broadcast transmission through cable or satellite providers, the PnP device may function as a pass through for the audiovisual information. The PnP device first provides the audiovisual information to a digital video recorder (DVR) or tuner unit, which then provides the audiovisual information to the display unit.

In block 609, the PnP device determines if a controller is active and, in some embodiments, which controller or controllers. In many embodiments, a controller may be activated by pressing a button or a plurality of buttons on the controller. In many embodiments, during activation, the controller will attempt to connect wirelessly to the PnP device. In some embodiments, the wireless connection may be a Bluetooth connection, although in other embodiments the wireless connection may be Wi-Fi connection. Once the controller has been activated and has successfully connected to the PnP device, the PnP device determines that the controller is active. If the controller fails to connect to the PnP device through a wireless connection, the PnP device will determine that no controller is active. If the PnP device determines that a controller is active, the process proceeds to block 611. Otherwise, if the PnP device determines that no controller is active, the process returns.

In block 611, the PnP device commands overlay of the instructive cue information over the audio/video display. In many embodiments, the audio/video may be a music video. In many embodiments, the instructive cue information comprising note charts, score, and messaging components will appear in the foreground of the display, while the audio/video aspect will appear in the background of the display.

Figure 7:
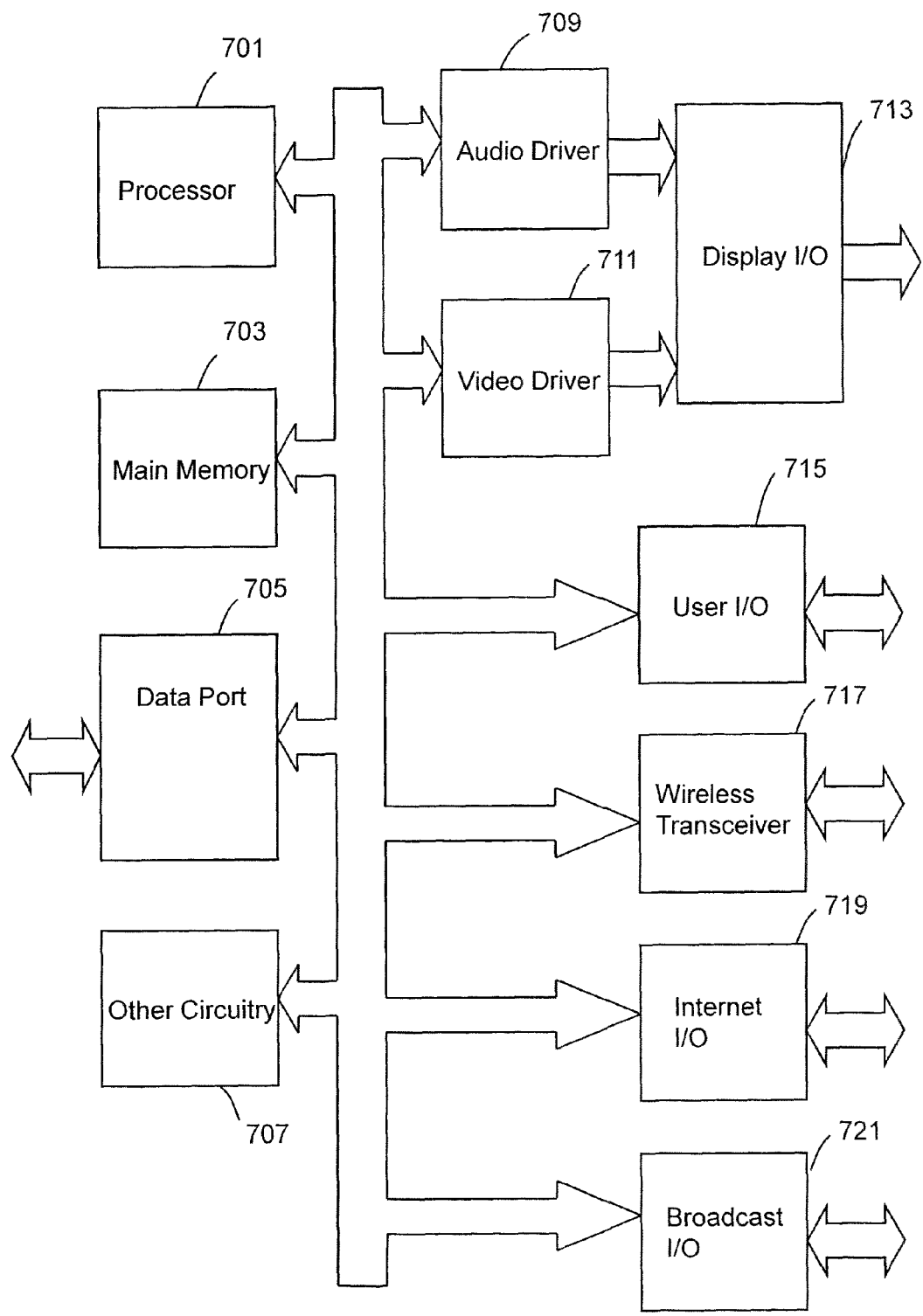
FIG. 7 is a block diagram of a PnP device.

FIG. 7 is an example of a block diagram of a PnP device in accordance with aspects of the invention. In the embodiment of FIG. 7, the PnP device includes at least one processor 701 interconnected with other components via a system bus. The other components may include, for example, a main memory 703 of the PnP device, a data port 705, a user input/output port 715, a wireless transceiver 717, a Internet input/output port 719, a broadcast input/output port 821, an audio driver 709, a video driver 711, a display input/output 713, and other circuitry 707, which may include for example an infrared sensor. In other embodiments of the invention, there may be different combinations of components that make up a video PnP device, depending on the individual needs of each application. For example, some embodiments may have both a user input/output port and a Bluetooth wireless transceiver, while some embodiments may have only a user input/output port and others embodiments only a Bluetooth wireless transceiver.

The processor executes program instructions to render instructive cue information and provide music-based video game play. In some embodiments, the processor may obtain program instructions and game data from the broadcast input/output. In some embodiments, the processor may obtain program instructions and game data from the Internet input/output. In some embodiments, program instructions are preloaded in memory associated with the processor and the processor receives game data from the broadcast or the Internet. The processor also receives game player input signals from a video game controller, either through the user input/output port or the wireless transceiver. The processor processes the program instructions and received input signals to generate audio and video output signals representative of video game play.

The processor may also be in data communication with a display unit, generally combined with one or more speakers, which presents video game action to a game player of the system. The processor may send audio generation information to the audio driver, and video generation information to the video driver, each of which generates audio and video output signals, respectively, from the received transmission. The audio and video drivers forward the audio and video output signals through a combined display input/output port 713, or alternatively, separate audio and video input/output ports, to the display unit.

In some embodiments, the processor is also connected to the Internet via Internet input/output port. In some embodiments, an Internet connection may also be used by video game publishers to offer, for free or for sale, downloadable content associated with a particular game. In a music-based video game, downloadable content may include, for example, new songs, background audio tracks or other content.

Figure 8:
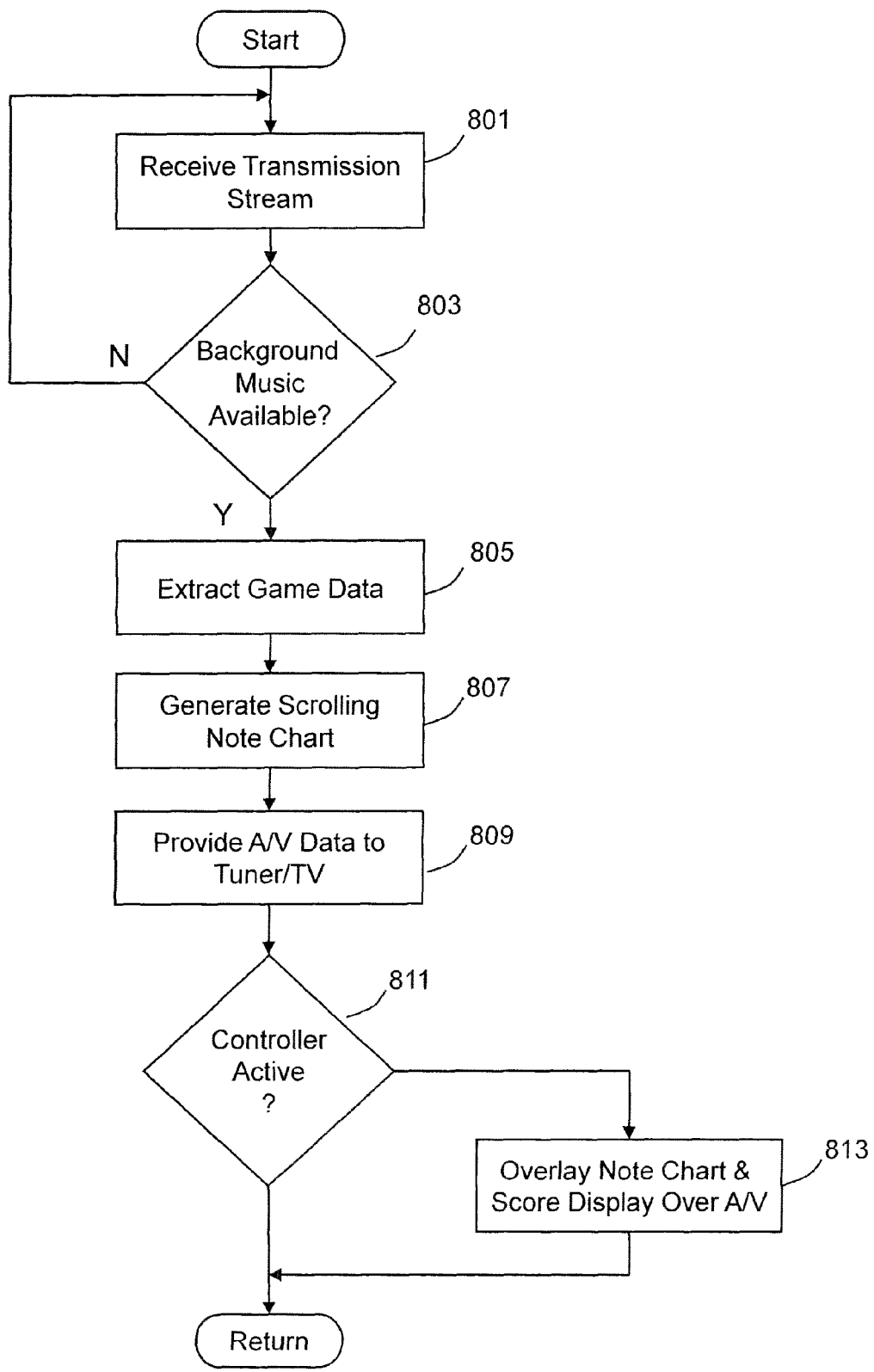
FIG. 8 is a flow diagram of further PnP device operation.

FIG. 8 is a flow chart of PnP device operations in accordance with aspects of the invention. In block 801, the PnP device receives a transmission. In many embodiments, the transmission is a television broadcast signal. For example, in some embodiments, cable content providers may transmit a television broadcast signal through a coaxial cable connection. In other embodiments, the television broadcast signal may be transmitted through fiber optic connections. In some embodiments, satellite content providers may transmit the television broadcast signal by means of communications satellite to a satellite dish and set-top box. In some embodiments, the television broadcast signal is transmitted in accordance with the ATSC data broadcast standard. In other embodiments, a streaming media format is transmitted by server to the PnP device through an Internet connection. For example, in some embodiments, the PnP device is connected to the Internet wirelessly through 802.11b/g Wi-Fi or other wireless connections. In other embodiments, the PnP device may be connected to the Internet through a wired Ethernet connection.

In block 803, the PnP device determines if the transmission contains audiovisual information compatible for use by the PO device. For example, audiovisual information, such as a music video, for which the PnP device may render instructive cue information, score, and a messaging component. In some embodiments, the PnP device may render instructive cue information, score, and messaging component for television programs with background music. In many embodiments, the PnP determines if the transmission contains audiovisual information compatible for use by the PnP device by reading header information and metadata transmitted with audiovisual information. For example in an ATSC broadcast stream, the PnP device may read information contained within the Packetized Elementary Stream (PES) to determine whether the broadcast stream contains compatible audiovisual information. If the PnP device determines that the transmission contains compatible audiovisual information and game data, the process proceeds to block 805. Otherwise, if the PnP device determines that the transmission contains no compatible audiovisual information and game data, the process goes to block 801.

In block 805, the PnP device extracts game data such as instructive cue information for a music-based video game from the transmission. In some embodiments, and as discussed in block 801, the transmission may be a television broadcast signal. In many embodiments, the television broadcast stream comprises standard audiovisual information and additional game data. The PnP device extracts the game data from the television broadcast signal. In some embodiments, and as discussed in block 801, the transmission may be a streaming media format received through an Internet connection. In many embodiments, the transmission will be in an MPEG or MPEG-like format, although in other embodiments, the transmission may be in other media formats In block 807, the PnP device generates instructive cue information. As discussed in block 805, game data is extracted from the transmission and the extracted data is utilized by the PnP device in generating instructive cue display information. In many embodiments, score and messaging components are also generated. In some embodiments, and as illustrated in FIG. 9, the instructive cue information may be arranged with gems scrolling vertically towards the bottom of the display, the score component towards the upper left of the display and a messaging component scrolling horizontally across the top of the display.

In block 809, the PnP device will provide audiovisual information to a display unit. In some embodiments, the PnP device may provide the audiovisual information to a display unit through a HDMI connection. In some embodiments, the PnP device may provide the audiovisual information to a display unit through component or composite connection. In other embodiments, the PnP device may provide video data to a display unit through a HDMI, component, or composite connection while providing audio data through an optical audio connection. In some embodiments, for example where the PnP device receives a streaming media format transmission, the PnP device may provide audiovisual information to a PC, which provides the audiovisual information to the display. However, in some embodiments, for example embodiments where the PnP device receives a television broadcast transmission through cable or satellite providers, the PnP device may function as a pass through for the audiovisual information. The PnP device first provides the audiovisual information to a digital video recorder (DVR) or tuner unit, which then provides the audiovisual information to the display unit.

In block 811, the PnP device determines if a controller is active. In many embodiments, a controller may be activated by pressing a button or a plurality of buttons on the controller. In many embodiments, during activation, the controller will attempt to connect wirelessly to the PnP device. In some embodiments, the wireless connection may be a Bluetooth connection, although in other embodiments the wireless connection may be Wi-Fi connection. Once the controller has been activated and has successfully connected to the PnP device, the PnP device determines that the controller is active. If the controller fails to connect to the PnP device through a wireless connection, the PnP device will determine that no controller is active. If the PnP device determines that a controller is active, the process proceeds to block 813. Otherwise, if the PnP device determines that no controller is active, the process returns.

In block 813, the PnP device overlays the instructive cue information over the audio/video display. In many embodiments, the audio/video may be a music video. In many embodiments, the instructive cue information comprising note charts, score, and messaging components will appear in the foreground of the display, while the audio/video aspect will appear in the background of the display.

FIG. 9 shows a screenshot of an example music-based video game rendered by the PnP device. In the particular screenshot of FIG. 9, the display includes a plurality of instructive cues arranged in a two note charts, a score and a messaging component. The instructive cues generally scroll downwards across portions of the screen towards and into a predefined area of the screen, such as the NOW area. However, in other embodiments, the display components may be positioned in alternate arrangements. For example, in some embodiments, the instructive cues may scroll across portions of the screen along a curved or semi-circular track. In some embodiments, the display may include other components or a subset of components. For example, in some embodiments, the display may include instructive cues and a score, without a messaging component. In some embodiments, the display may include instructive cues only.

During video game play, a game player is to depress or have depressed various buttons or other user manipulable input device of the controller responsive to the instructive cues, generally when the instructive cues reach a predefined area of the display such as the NOW area. In most embodiments the video game console evaluates the game player based on extent of compliance with operations commanded by the instructive cues, for example by providing a score, a simulated crowd response, and/or some other feedback to the game player. In some embodiments, video game play may include physical aspects. For example, instructive cues may command the player to perform various physical motions relating to dance or exercise such as stepping, balancing, and arm movements. The inputs may be generated from dance pads, balance related inputs, and motion based sensors and game controllers. In some embodiments, the video game evaluates the player based on extent of compliance with motions commanded by the instructive cues. In addition, the video game console generally commands presentation of audio during video game play. In most embodiments audio of a musical selection is provided as the game player complies with the instructive cues, and silence or a sound of a missed note, possibly depending on whether the game player operates incorrect input devices or does not operate any input devices, may be provided if the game player does not comply with the instructive cues.

Figure 10:
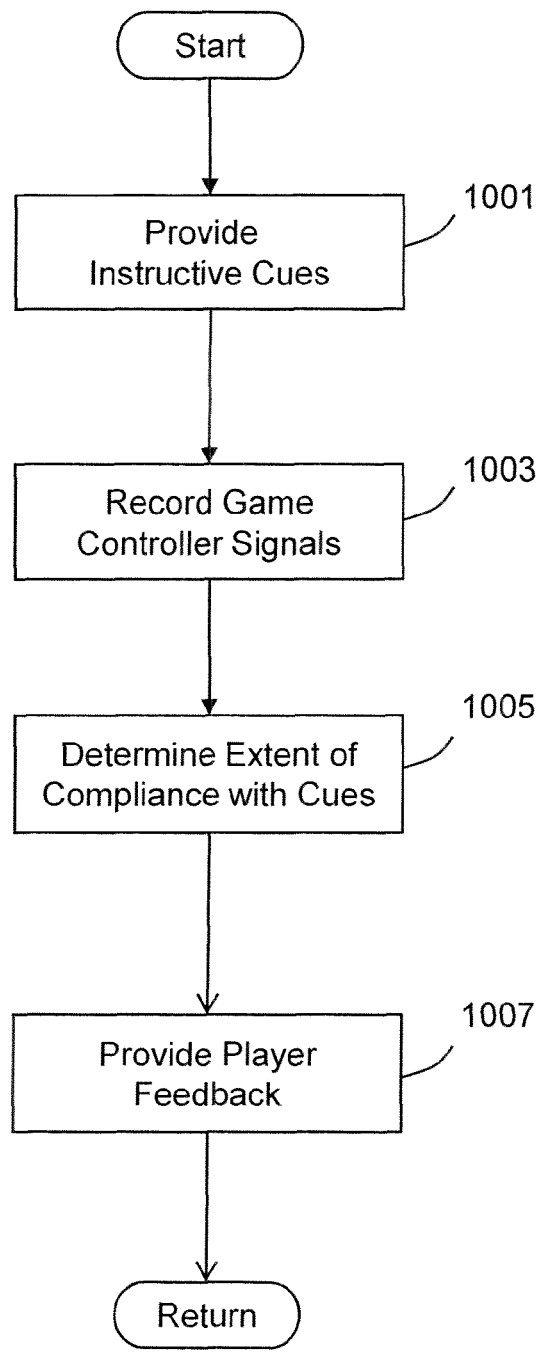
FIG. 10 is a flow diagram of video game play in accordance with aspects of the invention.

FIG. 10 is a flowchart of a process of providing a music-based video game. The process may be performed, for example, by a first component as discussed with respect to FIG. 4, or a processor of the first component, for example as configured by program instructions.

In block 1001 the process commands display of instructive cues. Display of the instructive cues may be provided, for example, by display of the instructive cues on a television or the like. In many embodiments the instructive cues take the form of gems which move or scroll across a portion of the display, with a game player to depress or have depressed buttons on a controller when the instructive cues reach a predefined area of the display.

In block 1003 the process receives signals indicative of status of a game controller. Generally the signals indicative of the status of the game controller include information regarding button state of buttons on the game controller or other input devices of the game controller. For example, the game controller may be in the general shape of a guitar, with the game controller including buttons on a neck of the controller and a strum bar positioned in abuse of the game controller, with the signals indicative of the status of the game controller indicating status of the buttons and the strum bar. Alternatively or in addition, the game controller may be in the general form of a drum set or a microphone, with the signals indicative of the status of the game controller providing information as to drum head strikes or auditory input to the microphone.

In block 1005 the process determines extent of game player compliance with the instructive cues. Generally a game player complies with a particular instructive cue of the instructive cues if the game player has manipulated the game controller as indicated by the particular instructive cue.

In block 1007 the process commands generation of feedback to the user, with the feedback related to extent of game player compliance with the instructive cues. In some embodiments the feedback may be an increase in point score if the game player complies with the instructive cues, a change in a power level for the game player, or other feedback. As another example, in some embodiments the process may command an auditory signal if the game player has not complied with a particular instructive cue.

Accordingly, aspects of the invention provide music based video game related systems and methods. Although the invention has been discussed with respect to various embodiments, it should be recognized that the invention comprises the novel and non-obvious claims supported by this disclosure.

The invention claimed is:

1. A device for use in a video game capable system, comprising:
    an input for receiving a transmission stream over the Internet of input data from a transmission system, the input data including audiovisual information and instructive cue information for a music-based game, the instructive cue information including timing information relative to the audiovisual information;
    communication reception circuitry configured to receive game controller signals; and
    at least one processor configured to a) process the instructive cue information, received by the input for receiving the transmission stream, to generate instructive cue display information, b) cause provision of the instructive cue display information to a display system as an overlay, c) cause provision in a pass through manner of at least the audiovisual information to the display system for decompression and formatting of the audiovisual information, received by the input for receiving the transmission stream, for presentation, and d) determine extent of game player compliance with the instructive cue display information based on the game controller signals.

2. The device of claim 1 wherein the instructive cue display information includes instructive cues.

3. The device of claim 1 wherein the instructive cues include scrolling timing indicators.

4. The device of claim 1 wherein the display system includes a set-top box and a display.

5. The device of claim 1 wherein the audiovisual information comprises compressed video information and compressed audio information.

6. The device of claim 5 wherein the compressed video information has been compressed using a discrete cosine transformation and motion compensation.

7. The device of claim 1 wherein the at least one processor is further configured to provide game player feedback based on the extent of game player compliance with the instructive cue display information based on the game controller signals.

8. The device of claim 7 wherein the at least one processor is configured to provide game player feedback by providing game player feedback information to the display system.

9. The device of claim 8 wherein the game player feedback information is a score.

10. The device of claim 1 wherein the instructive cue information is associated with audio of the audiovisual information.

\* \* \* \* \*